United States Patent Office 3,644,556
Patented Feb. 22, 1972

3,644,556
PRODUCTION OF HEXADIENES
Toshio Hori, Akira Yamamoto, and Masao Shiraishi, Mie-ken, Japan, assignors to Mitsubishi Petrochemical Company Limited, Tokyo-to, Japan
No Drawing. Filed Feb. 6, 1969, Ser. No. 797,231
Claims priority, application Japan, Feb. 8, 1968, 43/7,872
Int. Cl. C07c 3/10, 11/12
U.S. Cl. 260—680 B                    9 Claims

ABSTRACT OF THE DISCLOSURE

Ethylene and a 1,3-butadiene equivalent substance are codimerized through the use of a relatively inexpensive catalyst which is a combination of a copper compound (1), a compound (2) of an element of group V-A of the Periodic Table, and a compound (3) which is an alkyl compound or an alkyl halogen compound of an element of Group I, II, or III. Higher activity and higher selectivity for producing 1,4-hexadiene are attainable by the use of a catalyst produced by compounds (1) and (2) are precombined and the resulting combination is purified with an aromatic hydrocarbon or is prepared in the presence of ethylene.

BACKGROUND OF THE INVENTION

This invention relates to the production of hexadienes and more particularly to methods for producing hexadienes by causing reaction of ethylene and a 1,3-butadiene equivalent such as 1,3-butadiene. More specifically, the invention concerns a new method for causing the above mentioned reaction by means of a catalyst of unique character thereby to cause codimerization of the ethylene and 1,3-butadiene equivalent.

Intensive research has been carried out in recent years with respect to hexadienes obtained by codimerization reaction of ethylene and a 1,3-butadiene equivalent as, for example, 1,4-hexadiene, 1,3-hexadiene, 2,4-hexadiene, and 1,5-hexadiene, and new fields are being developed relative to the uses of these hexadienes. For example, 1,4-hexadiene, which is a non-conjugated diene, particularly the trans isomer thereof, is a highly important compound as a third component for imparting sulfur-vulcanizability to ethylene-propylene rubber (EPR), and the high utility of hexadienes such as 1,5-, 1,3-, and 2,4-hexadienes are described in disclosures such as Japanese patent publication No. 1994/1966 and No. 21995/1966 (corresponding respectively to U.S. patent application Ser. Nos. 196,894, now abandoned, and 261,875, now U.S. Pat. No. 3,297,667).

Of these hexadiene products, 1,4-hexadiene only will first be considered. Among the known catalysts for synthesizing 1,4-hexadiene, there are combined catalysts of organic aluminum compounds and iron or cobalt compounds. With the use of these catalysts, cis-1,4-hexadiene is formed. On the other hand, when a rhodium trichloride ($RhCl_3$—$3H_2O$) catalyst is used, a mixture of cis- and trans-1,4-hexadienes are formed. Furthermore, palladium catalysts are known as catalysts for synthesis of trans-1,4-hexadiene. Thus, the production of 1,4-hexadiene, especially trans-1,4-hexadiene, has required the use always of high-priced noble metals for catalysts and, therefore, has been extremely disadvantageous in the industrial sense.

SUMMARY OF THE INVENTION

It is an object of the present invention to provide a method for producing 1,4-hexadienes through the use of catalysts of extremely low price of a (copper compound)-(reducing agent)-(electron donor) class. (1,4-hexadienes thereby formed include a relative large quantity of the trans isomer).

Another object of the invention is to improve further the above stated catalysts and to produce 1,4-hexadienes with the use of such catalysts affording high activity and high selectivity while retaining their feature of low price. This object has been achieved by preparing special catalyst components in special forms and combining these components as described hereinafter.

According to the present invention in one aspect thereof, briefly summarized, there is provided a method for producing hexadienes characterized by the reaction of ethylene and a 1,3-butadiene equivalent in the presence of a catalyst of the class comprising a combination of (1) a copper compound, (2) a compound of an element of Group V-A of the Periodic Table, and (3) an alkyl compound or an alkyl halogen compound of an element of Group I, II, or III.

According to the present invention in another aspect thereof there is provided a method for producing hexadienes characterized by the codimerization of ethylene with a 1,3-butadiene equivalent with the use of a catalyst of the class comprising a combination of a copper catalyst component consisting of a copper halide complex compound prepared beforehand by causing a copper halide compound to react with a phosphine compound representable by the general formula $PR_3$ (where R is an alkyl radical or a phenyl radical) and an organic aluminum catalyst component consisting of an organic aluminum compound and characterized in that the copper catalyst component is prepared by one of the following procedures.

(1) The copper halide complex compound is purified with an aromatic hydrocarbon.

(2) The copper halide complex compound is prepared in the presence of ethylene.

The nature, details, and utility of the invention will be more clearly apparent from the following detailed description beginning with general considerations and concluding with specific examples of practice constituting preferred embodiments of the invention.

DETAILED DESCRIPTION

The above mentioned copper compound (1) to be used as a catalyst in accordance with the invention in place of a noble-metal component in known catalysts can be selected from a very wide range of substances. Representative examples of such substances are oxides, nitrides, sulfides, halogenides, sulfates, nitrates, carbonates, hydroxides, phosphates, and cyanides.

Specific examples are cuprous oxide, cupric oxide, ammonium cupric oxide, cuprous sulfide, cupric sulfide, cuprous sulfate, cupric sulfate, ammonium cupric sulfate, cuprous chloride, cupric chloride, cuprous bromide, cupric bromide, cuprous iodide, cupric iodide, cuprous fluoride, cupric fluoride, cupric carbonate, cuprous nitrate, cupric nitrate, cupric phosphate, and cuprous cyanide. These compounds are preferably in the form of anhydrides in all cases.

In addition to inorganic copper compounds as enumerated above, organic acid bases can be used. Examples thereof are cupric citrate, copper formate, copper acetate, and chelate compounds, a specific example being copper acetylacetonate.

Of these copper compounds, examples of compounds which have been found to be particularly preferable are copper halides and copper acetylacetonate.

Examples of Group V-A elements whose compounds are suitable for use as the aforementioned second component (2) are nitrogen, phosphorus, arsenic, antimony, and bismuth. Examples of compounds of these Group V-A elements are as follows.

Examples of general classes of phosphorous compounds are phosphines of the $PR^1 R^2 R^3$ type (where $R^1$, $R^2$ and $R^3$ are respectively and independently an alkyl radical, an aryl radical, or a halogen) and phosphites of the $P(OR)_3$ type (where R is an alkyl radical or an aryl radical). Specific examples of these compounds are tributylphosphine, triethylphosphine, triphenylphosphine, tritolylphosphine, trichlorophosphine, tribromophosphine, triphenylphosphite, triethylphosphite, trilaurylphosphite, tribenzylphosphite, diethylbutylphosphine and diphenylethylphosphine.

Examples of general classes of nitrogen compounds which are particularly preferred for use in accordance with the invention are aliphatic amines, aliphatic diamines, and aromatic amines. Specific examples of these compounds are methylamine, butylamine, isoamylamine, methylethylamine, methylisobutylamine, dimethylamine, diethylamine, trimethylamine, triethylamine, dimethylpropylamine, dimethylethylamine, trimethylenediamine, triethylenediamine, tetramethylenediamine, hexamethylenediamine, aniline, P-toluidine, O-phenylenediamine, diphenylamine, dimethylaniline, and triphenylamine. Furthermore, compounds such as nitriles and amides can also be used.

Examples of arsenic compounds are trimethylarsine, methylarsine, chlorodimethylarsine, trimethylarsine oxide, 1,2-ethanediarsine, and tetraethylarsonium hydroxide. Examples of antimony compounds are methylantimony sulfide, methylantimony tetrachloride, triphenylstibine, and antimony trichloride. Examples of bismuth compounds are methylbismuth oxide, bismuth sesquioxide, bismuth chloride, and bismuth nitrate.

Of the above enumerated compounds of Group V-A elements, the preferable compounds are those of phosphorus and nitrogen. Among the phosphorus compounds, those such as triphenylphosphine, triphenylphosphite, tributylphosphine, trichlorophosphine, and diethylbutylphosphine have been found to be particularly preferable. Among the nitrogen compounds, those such as triethylamine, triphenylamine, methylamine, dimethylamine, and tetramethylenediamine have been found to be particularly preferable. It may be considered that these compounds of Group V-A elements can form addition compounds or complexes with the aforementioned copper compounds.

Examples of the aforementioned third catalyst component (3) consisting of an alkyl compound or an alkyl halogen compound of an element of Group I, II, or III are alkyl compounds or alkyl halogen compounds of metals such as lithium, beryllium, aluminum, zinc, boron, and magnesium. Of these compounds those which have been found to be preferable are aluminum alkyl and aluminum alkyl halogen compounds (including alkylaluminum sesquihalides). Specific examples of these compounds are triethylaluminum, triisobutylaluminum, tri-n-propylaluminum, tri-n-butylaluminum, tri-n-octylaluminum, tri-n-hexylaluminum, diethylaluminum monochloride, diisobutylaluminum monochloride, diisobutylaluminum monobromide, ethylaluminum dichloride, isobutylaluminum dichloride, isobutylaluminum bromide, isobutylaluminum sesquichloride, and ethylaluminum sesquichloride.

The compounds of this third compound (3) may be considered to be functioning as reducing agents to reduce the copper compounds and the copper catalyst component in the catalyst according to the invention. However, since the invention contemplates the utilization of the effect due to the coexistence of the aforedescribed three indispensable components, the invention is not to be limited in any manner by such reaction mechanisms and theories of the catalyst components.

While the catalyst of the invention is composed of the aforedescribed three components, the possibility of these components reacting with each other in some form in the codimerization reaction system and the possibility of the catalytic performance exhibited in the codimerization reaction system being promoted by other components coexisting in this reaction system cannot be denied.

The mol ratios of the component used in the catalyst of the invention differ depending on their combinations. For example, with respect to components (1) and (3), the mol ratio of the aluminum compound relative to the copper compound is ordinarily of the order of from 0.01 to 300 (preferably from 0.1 to an upper limit of from 50 to 60). Furthermore, the quantity of a copper compound with respect to the 1,3-butadiene equivalent is 0.0001 mol percent or more, preferably from 0.005 to 50 mol percent. The mixing proportion of component (1) and component (2) also differs with specific compounds, but the mol ratio of the compound of a Group V-A element relative to the copper compound is ordinarily from 0.01 to 20 (preferably from 0.05 to an upper limit of from 0.1 to 10).

The catalyst of the invention can be compounded in various ways and modes from these components. For example, the copper compound and compound of a Group V-A element may be caused to react prior to their introduction into the reaction vessel, the resulting reaction product being then added into the main reaction vessel, or these compounds may be added separately into the reaction vessel. For example, in forming a reaction product as mentioned above in the case of cupric chloride (anhydrous) and triphenylphosphine, for example, specific quantities of the cupric chloride and triphenylphosphine are respectively dissolved separately in hot butanol, and the resulting two liquids are mixed while still hot. The resulting mixture is cooled gradually, whereupon white flake crystals of phosphorus are obtained as a reaction product.

In addition, the catalyst components, in general, may be placed beforehand in a coexistent state prior to their use in the codimerization reaction. Furthermore, these components may be placed in a coexistent state for the first time immediately prior to the start of the dimerization reaction in the presence of both polymers. When the components are placed beforehand in a coexistent state, the reaction can be carried out under a solventless condition, in the presence of a solvent for the codimerization reaction as described hereinafter, or in the presence of either ethylene or the 1,3-butadiene equivalent.

In accordance with one specific embodiment of the invention, this catalyst is produced by one of the above mentioned methods, that is, by preparing beforehand a copper halide compound and a phosphine compound in a specific manner.

As mentioned above, the copper halide complex compounds utilized in the method of the invention, in general, can be prepared with relative ease. For example, such a complex compound can be produced by heating and mixing a copper halide compound and a phosphine compound in liquid state.

Thus, a copper halide compound such as, for example, cupric chloride, cupric bromide, cupric iodide, or a similar cuprous halide, preferably anhydrous cupric chloride, is dissolved in a suitable solvent as, for example, an aromatic hydrocarbon or an alcohol, particularly a monohydric alcohol having from one to eight atoms of carbon, preferably butanol. Separately, a phosphine compound such as, for example, a trialkylphosphine having an alkyl radical with from one to 10 carbon atoms, specific examples being tributylphosphine, triethylphosphine, or triphenylphosphine, preferably triphenylphosphine, is dissolved in a suitable solvent, preferably the solvent used in the preparation of the solution of the copper halide compound as, for example, butanol. The two solutions thus prepared are then added to each other in a hot state to prepare a copper halide complex compound.

By selecting the solvent in this case from among nonsolvents and poor solvents of the complex compound to be formed, the recovery of the complex compound can be facilitated. A copper halide complex compound prepared in this manner can be represented by the general formula $Cu_nX_n(PR_3)_m$ (where X designates a halogen, and $m$ and $n$ are integers) and, in general, is a crystalline substance.

A feature of the present invention is that a copper catalyst component consisting of this specific copper halide complex compound is prepared in a specific manner and used in the reaction. One method of this preparation in accordance with the invention is to purify the copper halide complex compound with an aromatic hydrocarbon. Examples of aromatic hydrocarbons suitable for this purpose are benzene, toluene, xylene, and ethylbenzene. Through the use of these hydrocarbons, the complex compound is purified by washing or recrystallizing.

A second method according to the invention of preparation of the copper catalyst component is to carry out the above described preparation of the copper halide complex compound in the presence of dissolved ethylene. When a complex compound prepared in this manner is used as a copper catalyst component, it is possible to suppress the formation particularly of 2,4-hexadiene thereby to increase the selectivity of 1,4-hexadiene and, moreover, to increase extremely the activity thereof.

A number of appropriate methods are possible for preparing this complex compound in the presence of ethylene. It is preferable that the ethylene is dissolved in the reaction solvent. For example, convenience can be afforded by a procedure wherein a solvent in which ethylene has been dissolved beforehand to a fully saturated concentration is preparatorily placed in a vessel, and to this solution a copper halide compound solution and a phosphine compound solution are added.

Then, after the copper halide compound and the phosphine compound have been caused to contact each other, it is preferable that the contact with ethylene be continued at least for a short time. A complex compound prepared in this manner in the presence of ethylene may be subjected to a purification process with the use of an aromatic hydrocarbon.

The copper catalyst component consisting of a copper halide complex compound prepared in this manner is combined with an organic aluminum component consisting of an organic aluminum compound to form a catalyst according to the invention.

The method of the invention, except for the use therein of a catalyst as described above, can be practiced in a manner which comprises essentially the same conditions, operational procedures, and other features generally applicable to a codimerization reaction of the instant character.

For the aforementioned 1,3-butadiene equivalent substance, an alkyl-substituted 1,3-butadiene (the number of carbon atoms in the alkyl radical should be below approximately 20, preferably below 6) can be used in addition to 1,3-butadiene itself. That is, any substance which is equivalent to 1,3-butadiene in the codimerization reaction with ethylene as, for example, a 2-lower alkyl 1,3-butadiene such as 2-methyl-1,3-butadiene or 2-ethyl-1,3-butadiene or a 1-lower alkyl butadiene such as 1-methyl-1,3-butadiene or 1-ethyl-1,3-butadiene, can be used.

This reaction can be carried out in an environment other than a solvent, or it can be carried out in a suitable solvent. Examples of suitable solvents are: hydrocarbon halides such as monochlorobenzene, monobromobenzene, methylene chloride, 1,2-dichloroethane, tetrachloroethylene, and trichloroethylene; aliphatic hydrocarbons such as propane, butane, pentane, hexane, and heptane; aromatic hydrocarbons such as benzene, toluene, and xylene; and alicyclic hydrocarbons such as cyclohexane and methylcyclohexane.

While the ethylene and 1,3-butadiene equivalent react stoichiometrically in the method of this invention, it is not necessary in all cases that these reactants be present in respective equivalent quantities within the reaction system. The reaction temperature is from $-10$ to 300 degrees C., preferably from 10 to 180 degrees C. When the temperature exceeds 200 degrees C., reaction of the hexadiene formed and the ethylene occurs, whereby byproducts readily form. While this reaction can be carried out under atmospheric pressure, it is preferably carried out with ethylene pressurization, particularly with ethylene pressurization of from 10 to 700 kg./cm.$^2$.

The method of the invention depending on this reaction can be practiced by either a continuous process or a batch process.

The hexadienes producible by the method of the invention include conjugated hexadienes and non-conjugated hexadienes. When one of the components of the starting materials is 1,3-butadiene, hexadienes such as 1,4-hexadiene, 1,3-hexadiene, 1,5-hexadiene, and 2,4-hexadiene are formed. When one of the components is a 2-alkyl-1,3-butadiene, hexadienes such as 5-alkyl-1,4-hexadiene, 4-alkyl-1,4-hexadiene, 2-alkyl-2,4-hexadiene, and 3-alkyl-2,4-hexadiene are formed.

The reaction products thus formed can be removed from the reaction system by a suitable known method. Furthermore, the catalyst can be used continuously.

In order to indicate still more fully the nature and utility of the invention, the following examples of specific practice constituting preferred embodiments thereof are set forth, it being understood that these examples are presented as illustrative only and that they are not intended to limit the scope of the invention.

EXAMPLE 1

A copper catalyst component is prepared by causing anhydrous cupric chloride and triphenylphosphine to react. More specifically, 1.77 grams (g.) of anhydrous cupric chloride is heated and dissolved in 100 cc. of n-butanol (the resulting solution being called liquid A). Separately, 6.2 g. of triphenylphosphine ($PO_3$) is heated and dissolved in 100 cc. of n-butanol (the resulting solution being called liquid B).

Liquids A and B are brought together while they are still hot, and the resulting mixture is left in an atmosphere at room temperature to cool slowly, whereupon crystals are formed. These crystals are filtered out from the n-butanol to produce the desired copper catalyst component. This product is in the form of white flaky crystals and may be considered to be an addition compound of the form $Cu_nCl_n(PQ_3)_m$.

An autoclave of 1-liter capacity is charged in the presence of nitrogen gas with a glass ampule containing 6.66 cc. of ethylaluminum sesquinchloride, 250 cc. of monochlorobenzene, 6 g. of the copper catalyst component prepared in the above described manner, and 100 cc. of liquefied butadiene in the order named. The autoclave is then closed and sealed. Pressure is applied to the batch by means of ethylene to adjust the pressure to 45 kg./cm.$^2$. at 60 degrees C.

The batch within the autoclave is then vigorously agitated to break the glass ampule, whereupon the reaction starts. The agitation is contained for 3 hours, and then the pressure is released. Butanol is then added to the batch to stop the reaction.

As a result of the above described procedure in an actual instance, 18.8 g. of trans-1,4-hexadiene, 10.1 g. of cis-1,4-hexadiene, 45.6 g. of 2,4-hexadiene, and 2.8 g. of $C_8$ diene were formed.

EXAMPLE 2

The procedure set forth in Example 1, except for a change of from 6.66 cc. to 3.33 cc. in the quantity of the ethylaluminum sesquichloride, was carried out, whereupon 3.9 g. of trans-1,4-hexadiene and 1.0 g. of cis-1,4-hexadiene were formed. In addition, 6.4 g. of 2,4-hexadiene was formed, and a small quantity of $C_8$ diene was produced as a byproduct.

EXAMPLE 3

Instead of preparing the copper catalyst component used in the reaction prior to its introduction into the reaction vessel as in Example 1, the various ingredients were added separately into the reaction vessel. More specifically, in place of triphenylphoshine, 2.76 g. of tri-n-butylphosphoine and 0.918 g. of anhydrous cupric chloride were respectively added into the reaction vessel to carry out the reaction.

As a result, 0.64 g. of 1,4-hexadiene was produced as a mixture of trans-1,4-hexadiene and cis-1,4-hexadiene, and 2,4-hexadiene was not formed.

EXAMPLE 4

The procedure set forth in Example 3, except for the use of 4.23 g. of triphenylphosphine in place of tri-n-butylphospine, was carried out with 0.918 g. of anhydrous cupric chloride.

As a result, 0.1 g. of 1,4-hexadiene as a mixture of trans-1,4-hexadiene and cis-1,4-hexadiene was produced, but 2,4-hexadiene was not formed. In addition, 0.2 g. of a substance of high boiling point was formed.

EXAMPLE 5

A procedure similar to that of Example 3 was carried out with 6.66 cc. of ethylaluminum sesquichloride, 250 cc. of n-heptane, 1.223 g. of anyhdrous cupric chloride, and 4.78 g. of triphenyphoshine.

As a result, 4.1 g. of 1,4-hexadiene and 0.9 g. of 2,4-hexadiene were produced. In addition 0.8 g. of $C_8$ diene was formed.

EXAMPLE 6

(1) Approximately 7 g. of a complex compound of cupric chloride and triphenylphosphine prepared in the above described manner was dissolved in 200 cc. of benzene and recrystallized. The compound thus obtained was used as the copper catalyst component.

(2) An autoclave of 1-liter capacity was charged in an atmosphere of nitrogen gas with 3.33 cc. of ethylaluminum sesquichloride contained in a glass ampule, 250 cc. of monochlorobenzene, 3 g. of the copper catalyst component prepared as described above in paragraph (1), and 100 cc. of liquefied butadiene in the order named. The autoclave was then closed and sealed. Pressure was applied to the batch with ethylene to adjust the autoclave internal pressure to 45 kg./cm.$^2$. at 60 degrees C.

The batch was then vigorously agitated to break the glass ampule and thereby to start the reaction. After the agitation was continued for 3 hours, the autoclave pressure was released, and butanol was added thereinto to stop the reaction.

As a result, 39.9 g. of trans-1,4-hexadiene, 20.1 g. of cis-1,4-hexadiene, 22.5 g. of 2,4-hexadiene, and, in addition, 4.5 g. of $C_8$ diene were produced.

EXAMPLE 7

(1) 100 cc. of dehydrated n-butanol was placed in a one-liter flask with four openings, heated to 60 degrees C., and caused to be saturated with ethylene gas. Separately, a solution (called liquid A) was prepared by dissolving 10.48 g. of triphenylphosphine in 100 cc. of n-butanol. Furthermore, a solution (called liquid B) was prepared by by dissolving 2.7 g. of $CuCl_2$ in n-butanol.

Liquids A and B were added into the above mentioned flask previously heated to 60 degrees C, and the batch was caused to react for 10 minutes in ethylene. The interior of the flask was cooled to 5 degrees C., and the batch was caused to react further for one hour as the flow of ethylene was continued, whereupon crystals were formed. These crystals were used as the copper catalyst component in accordance with the invention as described below.

(2) By a procedure similar to that in Example 6, an autoclave was charged in an atmosphere of nitrogen with 6.66 cc. of ethylaluminum sesquichloride contained in a glass ampule, 250 cc. of monochlorobenzene, 1 g. of of the above described copper catalyst component, and 100 cc. of liquefied butadiene in the order named. The autoclave was closed and sealed. The pressure within the autoclave was then adjusted to 45 kg./cm.$^2$ at 60 degrees C. by pressurization with ethylene.

The batch was then vigorously agitated to break the glass ampule and thereby to start the reaction. After the agitation was continued for 3 hours, the autoclave internal pressure was released, and butanol was added to the batch to stop the reaction.

As a result, 32.9 g. of trans-1,4-hexadiene, 13.1 g. of cis-1,4-hexadiene, 17.2 g. of 2,4-hexadiene, and, in addition, 14.5 g. of $C_8$ diene were formed.

What is claimed is:

1. A method for producing a hexadiene by the co-dimerization of ethylene and a diene selected from the group consisting of 1,3-butadiene and alkyl substituted 1,3-butadiene which comprises contacting said ethylene and said diene in the presence of a catalyst consisting essentially of a copper halide, a phosphine of the formula $PR^1R^2R^3$, wherein $R^1$, $R^2$ and $R^3$ may be the same or different and are each selected from the group consisting of alkyl, aryl and halogen and an alkylaluminum sesquihalide.

2. A method according to claim 1 in which said phosphine is trialkyl phosphine or triphenyl phosphine.

3. A method according to claim 1 in which said diene is 1,3-butadiene.

4. A method according to claim 1 in which said diene is an alkyl substituted 1,3-butadiene wherein the alkyl group contains less than 6 carbon atoms.

5. The method for producing a hexadiene as claimed in claim 12 in which prior to the contacting of said ethylene and said diolefin, said copper halide and said phosphine are reacted to form a reaction product by mixing a solution of the copper halide, a solvent and a solution of the phosphine compound in said solvent, said solvent being such that it does not substantially dissolve said reaction product at least at low temperatures.

6. A method for producing a hexadiene by the co-dimerization of ethylene and a diene selected from the group consisting of 1,3-butadiene and an alkyl substituted 1,3-butadiene which comprises contacting ethylene and said diene in the presence of a catalyst consisting essentially of a mixture of a copper halide complex obtained by reacting a copper halide and a phosphine of the formula $PR_3$ wherein R is a radical selected from the group consisting of alkyl and phenyl and an alkylaluminum sesquihalide.

7. The method for producing a hexadiene as claimed in claim 6 in which said copper halide and said phosphine are reacted by mixing a solution of the copper halide in a solvent with a solution of the phosphine compound in said solvent, said solvent being such that it does not substantially dissolve the resulting copper halide complex at least at low temperatures and ethylene being present during the reaction of said copper halide and said phosphine.

8. The method for producing hexadienes as claimed in claim 6 in which said copper halide complex is prepared by the reaction of a copper chloride and a triphenylphosphine and is purified by recrystallization from a solution thereof in an aromatic hydrocarbon.

9. The method for producing hexadiene as claimed in claim 6 in which said copper halide complex compound is prepared in the presence of ethylene and is further purified with an aromatic hydrocarbon.

References Cited

UNITED STATES PATENTS

| | | | |
|---|---|---|---|
| 3,306,948 | 2/1967 | Kealy | 260—680 |
| 3,450,732 | 6/1969 | Wilke et al. | 260—666 X |
| 3,465,056 | 9/1969 | Hambling et al. | 260—683.15 |
| 3,483,268 | 12/1969 | Hambling et al. | 260—683.15 |

PAUL M. COUGHLAN, Jr., Primary Examiner

U.S. Cl. X.R.

252—429 B